Patented Aug. 30, 1932

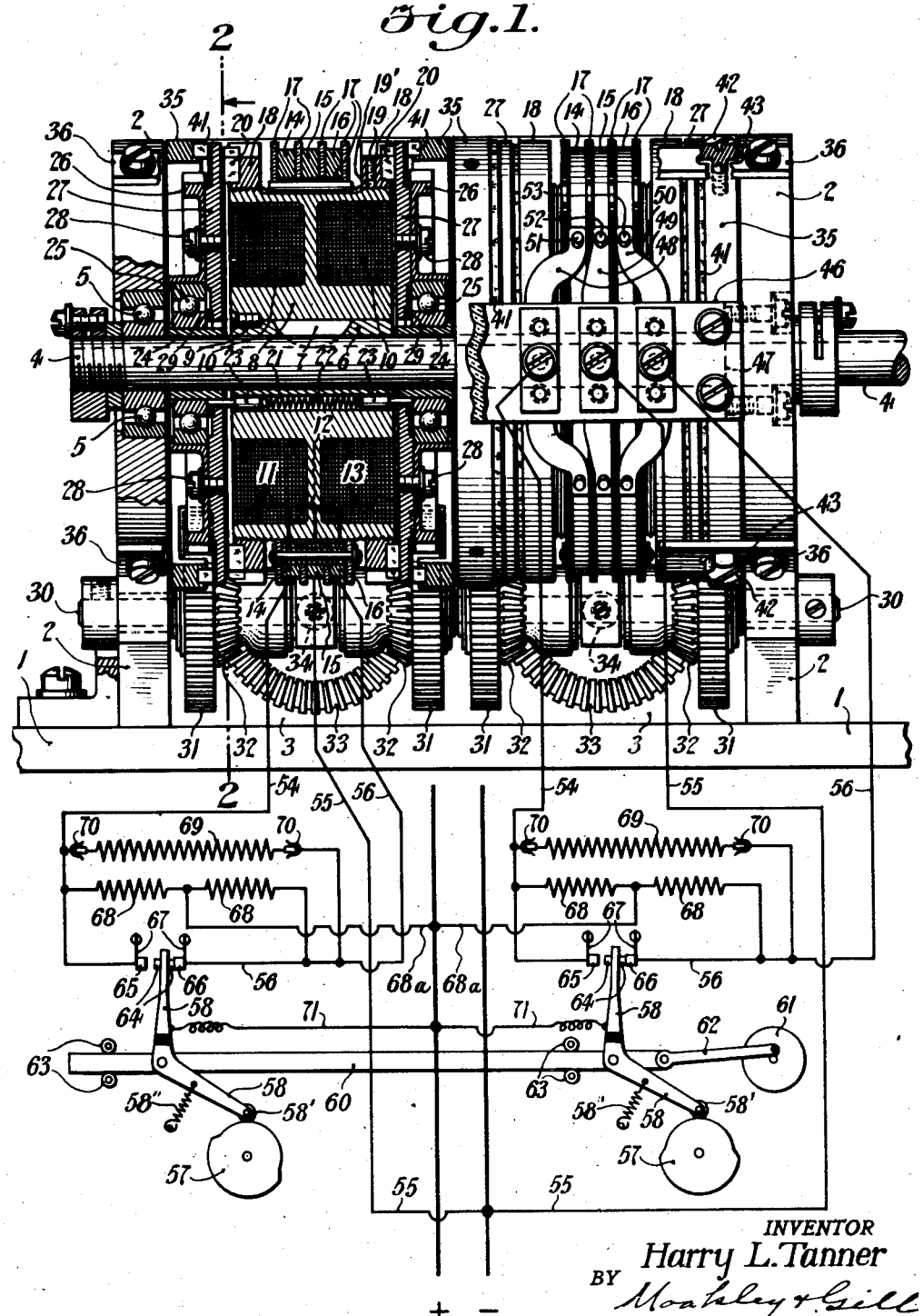

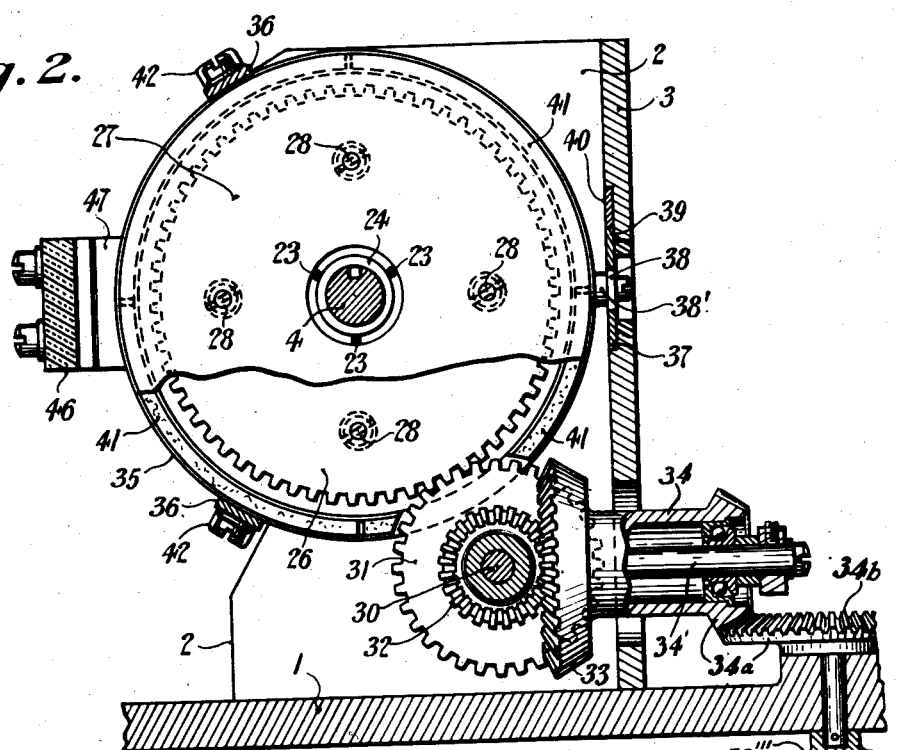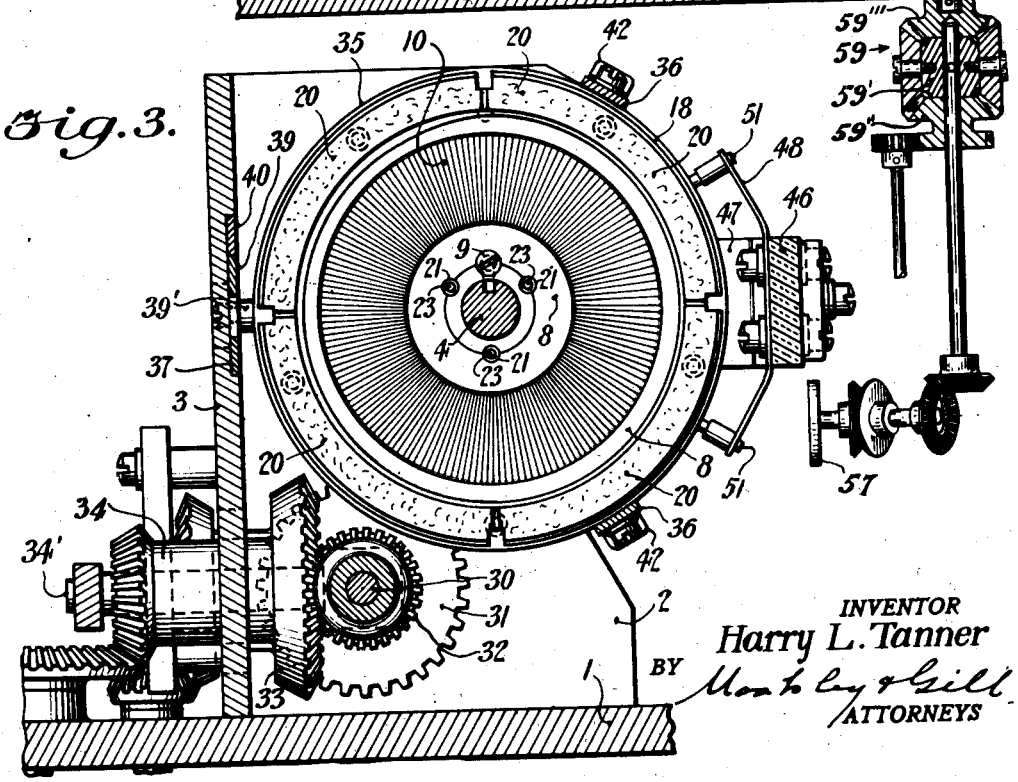

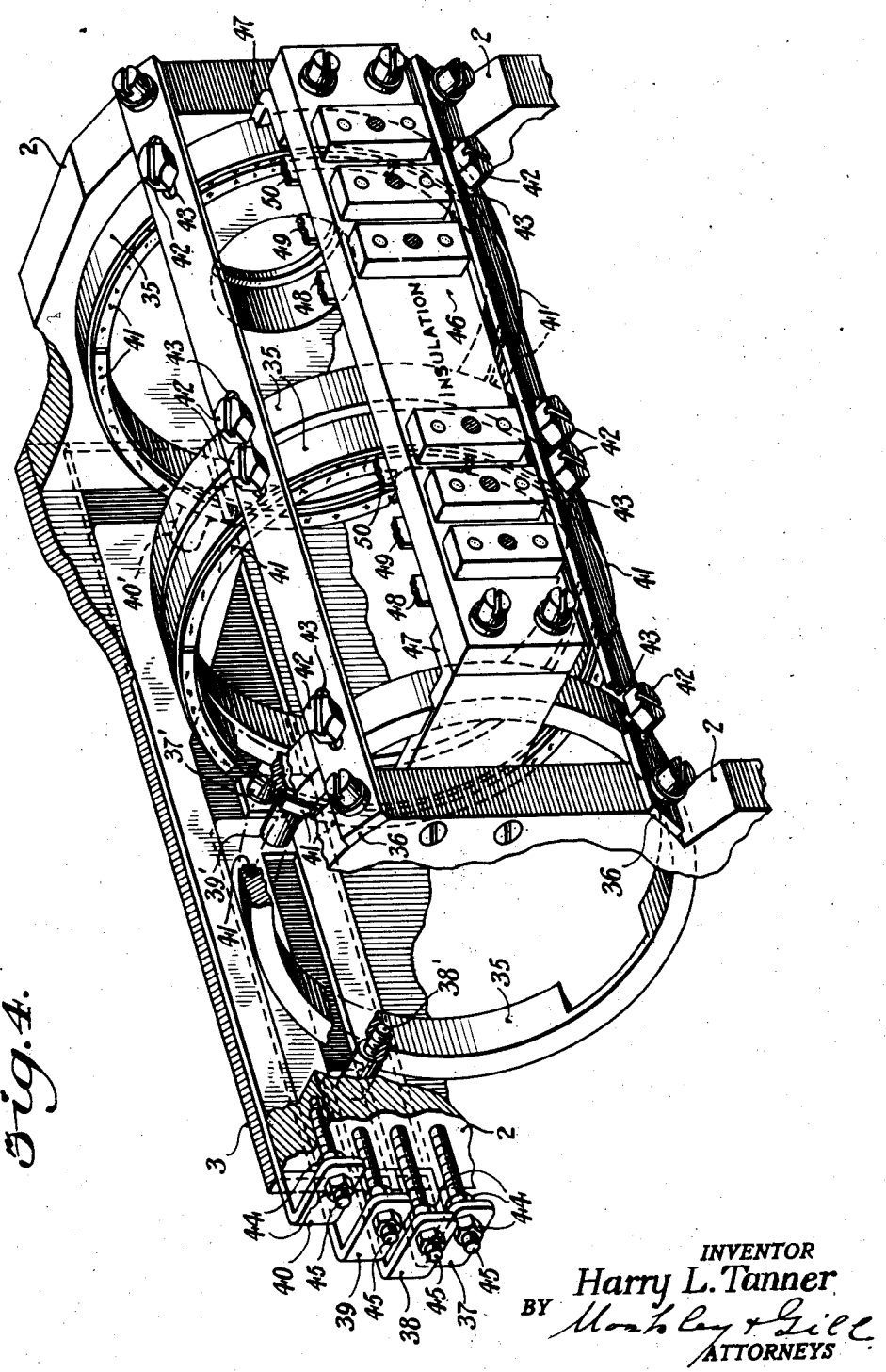

1,874,383

UNITED STATES PATENT OFFICE

HARRY L. TANNER, OF BROOKLYN, NEW YORK, ASSIGNOR TO FORD INSTRUMENT COMPANY, INC., OF LONG ISLAND CITY, NEW YORK, A CORPORATION OF NEW YORK

POWER TRANSMITTING APPARATUS

Application filed July 24, 1929. Serial No. 380,615.

This invention relates to power transmitting apparatus particularly adapted for use in cases where one element should follow smoothly and accurately another element which may operate at variable speeds, such as the elements of a follow-up system.

A simple reversible clutch is not suitable for this purpose on account of its tendency to produce hunting and overrunning of the driven member causing an unsteady movement and preventing it from following the driving member with sufficient accuracy and smoothness.

A simple reversible motor has many of the same disadvantages due to the even greater inertia of moving elements, such as its armature, which causes the controlling contracts to overrun because the elements cannot be stopped instantly.

In my prior application Serial No. 106,917 filed May 5, 1926 there is shown a mechanism the object of which is to overcome these disadvantages found in simple reversible clutches by the use of a smooth acting control mechanism readily following and transmitting variable speed motion and adapted to amplify the power input thereof to any desired degree. While this mechanism is an improvement over prior devices still further damping means are required in some cases.

It is accordingly an object of this invention not only to provide a power transmitting apparatus of simple construction for overcoming the disadvantages of simple reversible clutches and motors when used in connection with systems of the character referred to, but to provide certain improvements in the smooth operation and control of the special mechanism already developed.

More specifically this object as well as others which will more clearly appear hereinafter is attained by providing in connection with a clutch of the type having driving and driven elements and means for selectively connecting the elements in operative relation so that the driven element may be driven in one or the other direction, a braking device for checking or preventing movement of the driven element when in inoperative relation to the driving element and for damping oscillations which may be set up in the driven element whereby quicker reversals and consequent smoother and more satisfactory operation are obtained when the elements are in operative relation.

A preferred embodiment of the invention is shown in the accompanying drawings in which two identical devices embodying the same form of the invention are connected to the same shaft each operating independently.

Fig. 1 shows a front elevation partly broken away, one of the devices being shown chiefly in section through its center, and the electrical connections being shown diagrammatically;

Fig. 2 is a sectional view taken along the line 2—2 of Fig. 1 looking in the direction of the arrow;

Fig. 3 is another sectional view taken along the line 2—2 of Fig. 1 looking in the opposite direction to the arrow; and Fig. 4 is a perspective view with certain parts removed to show more clearly the means for adjusting the braking devices.

Referring to Figs. 1, 2 and 3, a frame is shown which comprises a base 1, two end standards 2 suitably connected to the base, and a rear plate 3 extending between and in fixed relation to the standards 2. An input member or drive shaft 4 is mounted in the frame on ball bearings 5, which are supported by the end standards 2. To this shaft a sleeve 6 is secured by means of a key 7. Upon the sleeve 6 is placed an iron core 8 rigidly attached to the sleeve by means of a screw 9 threaded into a tapped hole drilled along the parting surface between the sleeve and the core so that one-half of the hole is in each. Securely fastened in a recess in each side of iron core 8 is an insulated coil 10 adapted to be energized to magnetize one side of the core 8. Connections 11, 12 and 13 from the coils 10 are led out to slip rings 14, 15 and 16 respectively, these rings being fixedly mounted on the circumference of the iron core 8 and insulated from the core and each other by insulation 17. Over each end of the iron core is screwed a ring 18, the position of which is fixed by means of set screws 19, one of which is shown in Fig. 1, these set screws being placed in radially tapped holes through the ring so that they exert pressure on the threads of the core. Between the screws and these threads may be placed a piece of soft metal 19' to prevent damage to the threads. On the side of each ring facing away from the core 8 are fastened in an annular recess for that purpose four narrow curved cork pads 20 forming an intermitted annulus, as best shown in Fig. 3.

Drilled along the parting surface between the sleeve 6 and the core 8 to be partially present in each are three holes 21 equally spaced around the annular parting surface, as also shown in Fig. 3. In each hole is a compression spring 22 which bears at its opposite ends upon the plungers 23. Slidably mounted on the shaft 4 are two sleeves 24, one at each side of the sleeve 6, as shown in Fig. 1, and on each sleeve is mounted a ball bearing 25, to the outer race of which is fitted a gear 26, also shown in Fig. 2. To each gear a steel disc 27 is rigidly attached, as by screws 28, the disc having a flat radial surface facing the magnetizable core 8. In an annular groove around the center hole of each disc is fitted a collar 29 forming a suitable bearing surface between the disc and the inner face of the ball bearing 25. The whole gear and disc assembly including the parts 24, 25, 26, 27, 28 and 29 is adapted to slide along the shaft 4. Between the inner circumference of the collar 29 and the sleeve 24 a recess is formed into which reduced ends of the plungers 23 fit, the tips of the plungers bearing on the inner ball bearing race. The springs 22 thus serve to repel the opposite gear and disc assemblies from each other and from the magnetic core 8.

By passing current through either of the coils 10 a flux is set up which attracts the adjacent steel disc 27 and causes it to engage frictionally with the cork padding 20. With the shaft 4 being driven, the motion will be transmitted to the attracted disc and gear assembly, which becomes a driven element, while the assembly that includes the electromagnet, the ring 18 and the cork pad 20 becomes the driving element.

The distance to which either ring 18 is screwed on the core may be varied and its position then set by means of the set screws 19. By varying this distance the magnetic force exerted upon the driven disc 27 when its associated coil 10 is energized may also be varied. This, therefore, is a means for adjusting the initial force with which the driving and driven elements engage and also for limiting the maximum pull.

A counter shaft 30 is mounted between the end supports 2 parallel to the driving shaft 4 and near the base 1 of the frame. Rotatably mounted on this shaft by means of suitable bearings are gears 31 each being in mesh with one of the driven-element gears 26. The face of each gear 31 is wider than that of the gear 26 with which it meshes to allow such gear 26 to slide on its shaft 4 without becoming disengaged from its companion gear 31. Integrally combined with each gear 31 is a bevel gear 32. Both of these bevel gears 32 are in mesh with a single bevel gear 33 rigidly mounted on a tubular hub or sleeve 34, shown in Figs. 2 and 3 as being mounted perpendicularly to shaft 30 on a fixed stud 34' by ball bearings, the sleeve 34 being the driven or output element.

Since the bevel gears 32 are both in mesh with the same bevel gear 33 at diametrically opposite points they are adapted to rotate it in opposite directions. When one driven element is connected to the core 8, the opposite driven element comprising the other steel disc 27 and its gear 26 will be disconnected from the core by a suitable controlling means to be described, and will be driven through the gears 31, 32, 33, 32, 31 in the opposite direction to that of the magnetic core. Thus, by connecting either driven element to the core by energizing the corresponding coil, the rotation of the driven element, or sleeve 34, may be reversed, while that of the driving element, or drive shaft 4, of course, remains the same.

So far the description has been substantially like that of a mechanism described in my prior application Serial No. 106,917 except for the spring and plunger arrangement for repelling the opposite driven elements, and the means for adjusting the magnetic clutch, these being parts of the present invention. The means for braking and damping the output sleeve 34 constituting the principal feature of this invention will now be described.

Still referring to Fig. 1, two rings 35 for each clutch, one adjacent to each driven disc 27 of the clutch mechanism considered and each encircling the driven gear 26 attached to the disc to which it is adjacent, are supported by two cross bars 36 screwed to the standards 2 and individually adjustable by separate adjusting bars 37, 38, 39 or 40, depending upon which ring is referred to, as well shown in Fig. 4. In an annular recess in each ring 35 on the side facing the adjacent driven disc 27 are fastened by suitable means four arcuate cork pads 41, shown in Fig. 2 to constitute an intermitted annulus. Each ring 35 with its cork padding 41 serves as a brake shoe against which the driven discs 27, when unattracted by the core 8, are pressed by the internal springs 22 and the plungers 23 at opposite ends thereof which bear on the slidable driven element assemblies that are on opposite sides of the core 8.

The total distance through which this slidable assembly is allowed to move is relatively small, and, for example, may be not greater than .010''. This is obtained by an adjustment through means shown in Fig. 4. Each brake shoe 35 is shown, there being four since this specific embodiment is of a twin clutch mechanism, each clutch operating independently. Screws 42 pass through the cross bars 36 into the rings 35 and may be loosened, thus allowing movement of the screws in elongated holes 43 in the bars 36, and, hence, a certain amount of lateral movement of the shoes 35. On the inside of the rear plate 3 of the supporting frame is a wide slot or groove running the full length of the plate, into which are fitted the four adjusting bars 37, 38, 39 and 40, adjustment being made by setting the nuts 44 on studs 45 that are seated in one of the standards 2, as at the left in Fig. 4. By this means the adjusting bars 37, 38, 39 and 40 may be moved lengthwise. Each bar is suitably connected to its respective brake shoe by shifting studs 37', 38', 39' and 40', respectively, near the opposite ends of the bars. When the correct clearance is obtained between each shoe and its associated disc, when the disc is tight against the core 8, the adjusting nuts 44 are tightened, as are the screws 42, and the shoe is thereby held firmly in the position that gives the proper relationship between it and the disc.

As shown in Fig. 4, a bar 46 of suitable insulating material is connected to the two end standards 2 by supports 47. To this bar are attached brush holders 48, 49, 50, for each transmitting mechanism. Referring to Fig. 1, brushes 51, 52 and 53 are respectively carried by the brush holders 48, 49 and 50, and bear on the slip rings 14, 15 and 16 respectively. By this means the coils 10 are connected to the external controlling device and the line through wires 54, 55 and 56.

The controlling device for each clutch is comprised of a cam 57, a bell-crank 58 having a roller 58' that is held against the cam by a spring 58" attached to an arm of the bell crank. The cam 57 is actuated by shafts and bevel gears from the center 59' of a differential 59 as shown in Fig. 2. One side 59" of the differential is actuated by the controlling element of a follow-up system of any suitable type, while the other side 59''' of the differential is actuated by the sleeve 34 through bevel gears 34a and a shaft 34b as shown in this figure, the sleeve thus constituting the following element of the system. The bell-crank 58 is pivoted on a reciprocating bar 60 that is actuated by an eccentric crank pin on a driving wheel 61 through a connecting rod 62, and is held in alignment by rollers 63. At one end of the bell-crank 58 are contact points 64 adapted to engage either of a pair of contacts 65 and 66 each of which is suspended by a flat spring 67. Resistances 68 are connected in parallel with the contact points. A resistance 69 with ends suitable for insertion into the clips 70 is used in the circuit for limiting the current flowing to either of the coils according to the operation of the controlling device, as more fully explained hereinafter. A flexible connection 71 is placed between the bell-crank 58 and one side of the line, while the other side of the line connects directly to the coils 10 by means of the line 55, brush holder 49, brush 52, slip ring 15 and connection 12.

The operation of either of the independent mechanisms is as follows: When the roller 58' of the bell-crank 58 is in a neutral position on one of the slopes that are intermediate the dwells of cam 57 so that the contact 64 touches neither contact 65 nor 66, as it is when the controlling and following elements of the follow-up system are in their normal relation, the circuit paths to the magnet coil 10 for fully energizing the latter are open, but other circuit paths for partially energizing coils 10 exist. Under these conditions, current flows from the positive line conductor through a conductor 68a to a point between the pair of resistances 68, there dividing to pass through each of these resistances, proceeding from one resistance 68 by the conductor 56 to the right hand magnet coil 10 and from the other resistance 68 by the conductor 54 to the left hand coil 10. From the coils 10 the current returns by the common connection 12 of the coils to the slip ring 15 continuing by the brush 52, its holder 49 and conductor 55 to the negative line conductor. Current thus flows through both magnet coils 10, but is so weakened by the presence of the resistances 68 that the attraction of the discs 27 toward the core 8 is reduced to an amount that opposes the action of the springs 22 only sufficiently to make the discs 27 quickly responsive to the energization of one or the other of the coils 10 by the stronger current applied thereto when contacts 64 engages contact 65 or 66.

When the cam 57 is turned by movement of the controlling element of the follow-up system relatively to the following-element which is assumed fixed at this time the bell-crank 58 is displaced from its normal position and contact is made between points 64 and 66. Current then flows from the positive side of the line through wire 71, bell-crank 58, contacts 64 and 66, wire 56, brush holder 50, brush 53, slip ring 16, connection 13 and through the right hand coil 10. It then flows through connection 12 to the line common to both coils and which comprises the slip ring 15, brush 52, brush holder 49, and wire 55 to the negative side of the line. The current magnetizes the core around the right hand coil, and draws the adjacent disc 27 to the core, as indicated in Fig. 1, against the action of the springs 22. The disc 27 on the left will now be driven in the opposite direction by the gearing, as before explained, as the drive shaft 4 runs. A smaller amount of current is allowed to flow through the left hand coil 10 than through the right hand coil 10, when the latter is energized to drive the right hand disc 27, the current being limited by the resistance 69 and flowing into the left hand coil through connections similar to those of the coil on the right. A small magnetizing force, depending on the current flowing through the resistance 69, will, therefore, act upon the left disc in opposition to the pressure exerted by the springs 22. This force may be varied by inserting different values of resistance between the clips 70. Hence the left hand disc 27 is pressed against the brake shoe by a resultant force less than the total force of the springs 22. If it is desired to increase this pressure to a maximum, the circuit of the left hand coil should be opened while the right hand coil is energized. The left hand disc 27 being pressed against friction pads 41 of the brake shoe 35 while being driven by the opposite driven element serves to damp oscillations of any jerky motion throughout the system.

The operation will continue until the side 59''' of the differential, that is driven from the sleeve 34 has turned the center 59', assuming the other side 59'' to be fixed at this time, to turn the cam 57 until bell-crank 58 occupies its neutral position to open the operating circuit.

If contact is made between 64 and 65 by a rotary movement of the cam 57 in the opposite direction the operation of the mechanism is exactly reversed. The current which flowed through the right hand coil 10 referred to above now flows through the left hand coil, and that which flowed through the left, now flows through the right. Consequently the drive is through the elements on the left, and the damping is effected by those on the right, and the direction of rotation of the output shaft is reversed.

In practice the driving wheel 61 is driven continuously by a prime mover and the pivots of the lever arms 58 are caused to oscillate thus causing contact between the point 64 and one and then the other of points 65 and 66. When the cam 57 moves the lever 58 to the neutral position the duration of contact on point 65 is equal to that on point 66 and this interval of contact is made short enough to keep the output sleeve 34 practically stationary.

When the cam 57 is moved to the position shown in the Fig. 1, the contact point 64 is still caused to strike both points 65 and 66, but the interval during which it is in contact with point 66 is much longer than that during which it is in contact with point 65. Therefore, the output sleeve 34, is given a resultant rotation in the corresponding direction. Upon reversal of the cam position the interval of contact between the points 64 and 65 becomes greater than that between 64 and 66, and, therefore, the resultant direction of rotation of the output sleeve 34 is reversed with respect to the previously mentioned direction. It is clear that the motion due to the operation of the cams 57 is superimposed upon the vibratory motion obtained from the reciprocation of the pivots, and that while the pivots are operated by a common shaft the cams 57 are operated independently by the follow-up systems.

It is understood that it is not the intention to limit the invention to the particular construction disclosed herein, but only by the scope of the claims hereto appended.

I claim:

1. In power transmitting apparatus having driving and driven elements provided with coupling means and mechanism controlling said means for selectively connecting the elements in operative relation, the combination of element-separating means, force-regulating means controlled by said selective mechanism regulating said element coupling and separating means, and a brake applicable to the driven element.

2. In power transmitting apparatus having driving and driven elements provided with coupling means and mechanism controlling said means for selectively connecting the elements in operative relation, the combination of element-separating means, force-regulating means controlled by said selective mechanism regulating said element coupling and separating means, and adjustable braking means for applying a braking effect to the driven element.

3. In power transmitting apparatus having driving and driven elements provided with coupling means and mechanism controlling said means for selectively connecting the elements in operative relation, the combination of damping means for certain of said elements, and a supplementary control governed by said mechanism and co-acting with said coupling means to co-operatively relate said damping means and the driven element to damp the movement of the latter.

4. In power transmitting apparatus having driving and driven elements provided with coupling means and mechanism controlling said means for selectively connecting the elements in operative relation, the combination of damping means adjustably correlated to certain of said elements, a supplementary control governed by said mechanism and co-acting with said coupling means to co-operatively relate said damping means and the driven element, and regulating means for relatively adjusting said damping means and the elements correlated thereto.

5. In power transmitting apparatus having driving and driven elements provided with coupling means and mechanism ineffective at times and when effective controlling said means for selectively connecting the elements in operative relation, the combination of element separating means, force-regulating means controlled by said selective mechanism regulating said element coupling and separating means, mechanism operable by another device provided with means for automatically operating said selective mechanism, and braking means applicable to the driven element when selective mechanism is ineffective.

6. In power transmitting apparatus, driving and driven elements, different plural-part coupling means therefor, a pair of members individually connected to the respective coupling means and arranged to drive the driven element in different directions, mechanism for selectively controlling said coupling means, and a plurality of brakes individually co-operative with parts of said coupling means in accordance with the control of the latter to exert a braking effect upon the movement of said members and the driven element.

7. In power transmitting apparatus, driving and driven elements, different plural-part coupling means therefor, a pair of members individually connected to the respective coupling means and arranged to drive the driven element in different directions, mechanism for selectively controlling said coupling means, a plurality of normally fixed adjustably mounted brake devices individually co-operative with parts of the different coupling means, and means to adjust the brake devices with respect to said coupling means parts.

8. In power transmitting apparatus, driving and driven elements, different plural-part coupling means therefor, a pair of members individually connected to the respective coupling means and connected to the driven element to drive it in different directions, mechanism selectively controlling said coupling means, a plurality of normally fixed brake devices individually co-operative with parts of the different coupling means, displaceable mountings for said brake devices, and adjusting devices for displacing said mountings and brakes with respect to the co-operative parts of said coupling means.

9. In power transmitting apparatus, driving and driven elements, different plural-part coupling means therefor, a pair of members individually connected to the respective coupling means and to the driven element to drive it in different directions, mechanism selectively controlling said coupling means, a plurality of damping devices co-acting with parts of said different coupling means, and an auxiliary control for said different coupling means alternating its control thereof with that of said selective mechanism to damp the motion of the driven element.

10. In power transmitting apparatus, driving and driven elements, different plural-part coupling means therefor, a pair of members individually connected to the respective coupling means and to the driven element to drive it in different directions, mechanism selectively controlling said coupling means, a plurality of damping devices juxtaposed to parts of said different coupling means and relatively displaceable with respect thereto, an auxiliary control alternatively effective with that of said selective mechanism in controlling said different coupling means, and adjusting devices for varying the relative displacement between said damping devices and the juxtaposed parts of said coupling means.

11. In power transmitting apparatus having driving and driven elements and a pair of members connected to one of the elements for selectively connecting the driven element to the driving element for movement in different directions, the combination of means associated with each of the members for exerting a braking effect upon the movement of the members and the driven element, means for holding the braking means in partial disengagement with the members during transmission of power and means for adjusting each of the braking means.

12. In a follow up system, the combination of a power actuated element, a driven element constituting the following part of the system, a pair of members connected to one of the elements for selectively connecting the power actuated element to the driven element for movement in different directions, a controlling element, means associated with each of the members for braking the movement of the members and the driven element, and algebraic means for selectively operating the members by the controlling element of the follow-up system and responsive to said following part to terminate such operation.

13. In a follow up system, the combination of a power actuated element, a driven element constituting the following part of the system, a pair of members connected to one of the elements for selectively connecting the power actuated element to the driven element for movement in different directions, means associated with each of the members for braking the movement of the members and the driven element, means for holding the braking means in partial disengagement with the members during transmission of power and means for adjusting each of the braking means.

14. In an electro-magnetic clutch, driving and driven elements, an impelling device having movement imparted to it by the driving element, a pair of discs connected to the driven element for moving the same in opposite directions, electro-magnetic means for selectively and frictionally connecting said impelling device and discs, brakes related to the respective discs, and brake operating mechanism effective to exert a braking effect upon the movement of the discs and the driven element when said electro-magnetic means is not energized to connect a disc and the impelling device.

15. In an electro-magnetic clutch, having driving and driven elements, and a pair of discs connected to one of the elements for selectively and frictionally connecting the driven element to the driving element for movement in opposite directions, the combination of means associated with each of the discs for exerting a braking effect upon the movement of the discs and the driven element and means for operating the clutch by a remote follow-up system.

16. In an electro-magnetic clutch driving and driven elements, an impelling device having movement imparted to it by the driving element, a pair of discs connected to the driven element for moving the same in opposite directions, means tending to separate said discs and impelling device, electro-magnetic means for frictionally connecting said impelling device and discs, damping devices correlated to each disc, and a selective control governing said electro-magnetic means to selectively connect one of said discs to said impelling device and to simultaneously apply one of said damping devices to the other disc.

17. In power transmitting apparatus, the combination of driving and driven elements, a pair of electro-magnets attached to one of the elements, a pair of magnetic members freely mounted on the same element and operatively connected to the other element, means for selectively completely energizing the electro-magnets to attract the corresponding member, a fixed friction member coacting with each of the magnetic members, resilient elements connecting the magnetic members for pressing the non-attracted member against its friction member when the other member is attracted, and means for partially energizing the non-completely energized electro-magnet to lessen the pressure of its magnetic member against the corresponding friction member.

18. In power transmitting apparatus, the combination of driving and driven elements, a pair of electro-magnets attached to one of the elements, a pair of magnetic members freely mounted on the same element and operatively connected to the other element, means for selectively completely energizing the electro-magnets to attract the corresponding member, a fixed friction member coacting with each of the magnetic members, resilient elements connecting the magnetic members for pressing the non-attracted member against its friction member when the other member is attracted, and means effective when the selective energizing means is not effective for partially and simultaneously energizing both electro-magnets to attract the magnetic members against the resilient elements only sufficiently to make them quickly responsive to their complete energization.

19. In power transmitting apparatus, the combination of driving and driven elements, a pair of electro-magnets attached to one of the elements, a pair of magnetic members freely mounted on the same element and operatively connected to the other element, means for selectively completely energizing the electro-magnets to attract the corresponding member, a fixed friction member coacting with each of the magnetic members, resilient elements connecting the magnetic members for pressing the non-attracted member against its friction member when the other member is attracted, and mechanism for continuously and rapidly actuating the selective energizing means.

In testimony whereof I affix my signature.

HARRY L. TANNER.